(12) United States Patent
Cho et al.

(10) Patent No.: US 6,928,289 B1
(45) Date of Patent: Aug. 9, 2005

(54) DEVICE AND METHOD FOR COMMUNICATING PACKET VOICE DATA IN MOBILE COMMUNICATION SYSTEM

(75) Inventors: Dong-Ho Cho, Seoul (KR); Sung-Won Lee, Seoul (KR); Young-Ky Kim, Seoul (KR); Hyun-Seok Lee, Seoul (KR); Sun-Mi Kim, Seoul (KR)

(73) Assignee: Samsung Electronics Co., Ltd., (KR)

( * ) Notice: Subject to any disclaimer, the term of this patent is extended or adjusted under 35 U.S.C. 154(b) by 0 days.

(21) Appl. No.: 09/383,802

(22) Filed: Aug. 26, 1999

(30) Foreign Application Priority Data

Aug. 26, 1998 (KR) .................................. 98/35311

(51) Int. Cl.[7] .............................................. H04J 3/16

(52) U.S. Cl. ................................ 455/452.2; 370/310.2

(58) Field of Search ............................... 455/466, 450, 455/452; 370/349, 389, 352, 355, 356, 310.1, 370/310.2, 395.2, 452.1, 452.2

(56) References Cited

U.S. PATENT DOCUMENTS

| | | | |
|---|---|---|---|
| 5,602,836 A | * | 2/1997 | Papadopoulos et al. ...... 370/280 |
| 5,883,893 A | * | 3/1999 | Rumer et al. ............. 370/395.6 |
| 5,940,479 A | * | 8/1999 | Guy et al. ................ 379/93.01 |
| 6,130,883 A | * | 10/2000 | Spear et al. .................. 370/328 |
| 6,198,728 B1 | * | 3/2001 | Hulyalkar et al. ........... 370/280 |
| 6,389,010 B1 | * | 5/2002 | Kubler et al. ................ 370/353 |

FOREIGN PATENT DOCUMENTS

| | | |
|---|---|---|
| JP | 03-013142 | 1/1991 |
| JP | 09-116954 | 5/1997 |
| JP | 10-210530 | 8/1998 |
| WO | WO 97/31492 | 8/1997 |

OTHER PUBLICATIONS

Japanese Office Action dated Feb. 12, 2003, issued in a counterpart application, namely, Appln. No. 200-568264.
Japanese Office Action dated Jun. 17, 2003 issued in a counterpart application, namely Appln. No. 2000-568264.
Canadian Office Action dated Aug. 13, 2003 issued in a counterpart application, namely, Appln. No. 2,306,813.
D.J. Goodman et al., "Packet Reservation Mulitple Access for Local Wireless Communication,"*IEEE Transactions on Communications*, vol. 37, No. 8, Aug. 1989, pp. 885-890.

* cited by examiner

*Primary Examiner*—Nick Corsaro
(74) *Attorney, Agent, or Firm*—Dilworth & Barrese LLP

(57) ABSTRACT

A device and method for communicating voice data in packet form in a mobile communication system. In the packet voice data communication method, upon generation of voice data, a packet voice channel is assigned, and an active state is entered where packetized voice data is transmitted on the voice channel. If there is no voice data for a predetermined time period while in the active state, the assigned voice channel is released, and an inactive state is entered where no voice data is transmitted. If the next voice data is generated while in the inactive state, the voice channel active state is entered where a voice channel is assigned to transmit the next voice data, and the voice data is transmitted.

19 Claims, 14 Drawing Sheets

DEVICE AND METHOD FOR COMMUNICATING PACKET VOICE DATA IN MOBILE COMMUNICATION SYSTEM

PRIORITY

This application claims priority to an application entitled "Device and Method for Communicating Packet Voice Data in Mobile Communication System" filed in the Korean Industrial Property Office on Aug. 26, 1998 and assigned Serial No. 98-35311, the contents of which are hereby incorporated by reference.

BACKGROUND OF THE INVENTION

1. Field of the Invention

The present invention relates generally to a device and method for supporting voice service in a mobile communication system, and in particular, to a device and method for communicating packet voice data, which can support more voice users.

2. Description of the Related Art

In a conventional mobile telephone system, as in a typical wire telephone service a fixed bandwidth is assigned from a voice call set-up to a voice call release in a line-type voice protocol. This corresponds to voice service over a mobile communication network such as IS-95, GSM (Global System for Mobile communication), and the like. When a call for voice service is established between a mobile station and a base station, fixed radio resources are assigned until the call is released. Therefore, the line-type voice protocol assigns fixed resources from call set-up to call release as shown in FIG. 1. A fixed assigned channel is assigned to a user even though the user does not continuously generate voice traffic, thereby preventing another user from using the channel.

Generally, voice traffic consists of an utterance period where sounds are produced and a mute period where no sounds are produced. While the ratio of utterance period to mute period varies with nation or individual user, research and analysis of user characteristics suggests that the ratio is 300 ms:700 ms, or 1 sec:1.35 sec.

A line-type voice service can be considered the best way to support voice quality because a fixed bandwidth is assigned all the time. From a user's perspective, however; the service is billed even for the mute period and thus the user pays for unused periods. From a service provider's perspective, bandwidth efficiency is decreased by assigning a fixed radio resource, the fixed radio resource being a very small bandwidth, as compared to a wire service.

Therefore, line-type service structure needs to change to a packet type so that other activated users can use the bandwidth. Theoretically, in the case of utterance period: mute period=300 ms:700 ms, three times more subscribers can be supported, and thus performance can be increased drastically.

However, slow progress has been made in this area because the existing radio resource managing scheme requires a large time delay and makes real-time control difficult. This is particularly true in IS-95, a control method which uses a 20 ms-control message. An IS-95 system performs control processes on a common channel and then multiplexes signal traffic and voice traffic on one channel by inband signaling in providing a service. Therefore, in order to support a mechanism of releasing a traffic channel during a mute period and assigning it during an utterance period, the traffic channel should be acquired through the common channel when the utterance period is entered. In this case, a time delay occurs due to contention-based channel acquisition. In addition, if the traffic channel is released during the mute period, control information cannot be transmitted because of inband signaling. Furthermore, since various functions including power control are related to the operation of a traffic channel, the traffic channel cannot be dynamically assigned and released in the conventional technology. Use of a 20 ms-control message incurs a delay of a few hundred milliseconds because of the processing time in requesting assignment of a traffic channel and releasing it in an active state. Hence, voice service quality cannot be ensured.

There are other conventional packet voice protocols in a wire network. They utilize the fact that a voice service has a mute period and an utterance period, to thereby efficiently use limited bandwidths. While connection-type line technology bills on the basis of time, the packet voice protocols bill a user on the basis of information about actual use of the network by packet-unit billing.

The packet voice services which have been studied so far have been designed and developed for use in wire networks. Discussion has been made about supporting this service over a radio network but no specifics have been suggested yet. This is because the structure of current mobile phone service cannot support packet-based technology.

The current packet voice service is based on ITU-T (International Telecommunication Union) G.764 "Packetized Voice Protocol". This is a LAN technology designed for widely used common channel access schemes but utilizable over a wire communication network. An Internet phone, which is a very popular packet voice service on the Internet, is designed based on the above technology. The difference between the Internet phone and the ITU-T G.764 is that the former is a layer-2 protocol while the latter uses RTP/RTCP (Realtime Transmission Protocol/Realtime Transmission Control Protocol) of the IETF (Internet Engineering Task Force) and is designed as a layer-4 protocol. The Internet phone is intended for use as part of a TCP/IP (Transmission Control Protocol/Internet Protocol) network since the RTP/RTCP is designed based on the IETF, and to efficiently use an existing IP network. However, the Internet phone and the ITU-T G.764 are almost the same in operation.

A problem with extension of the ITU-T G.764 to a radio network is that conventional wire network-based packet voice protocols such as the ITU-T G.764 are characterized by contention-based use of common channels. That is, over the Internet or a LAN, common channels are used and traffic transmission is implemented on the basis of contention between users (see FIG. 2). Therefore, no separate channel reservation technique for acquisition of a common channel and no channel release technique are necessary. In addition, the ability of the transmission end to detect the presence or absence of a contention is a feature of communication in non-connection service over a wire network.

When a common channel is used without a reservation in a radio communication network, the contention-caused time delay may have a great influence. It is impossible to detect a contention in the radio environment and a contention-based scheme shows a poor performance. Therefore, it is very difficult to design a radio packet voice protocol using a contention-based scheme. In particular, considering CDMA technology, power control and synchronization make it impossible to support a contention-based packet voice protocol using common channels.

Furthermore, the radio mobile communication network requires transmission/reception signals and control information to transmit voice traffic, maintain a call, and exchange control information. Thus, the common channel-based contention scheme is difficult to support. Especially, handoff of a mobile station makes it more difficult to support because time delay and inconvenience are involved in transmission/reception of handoff-related information and process messages.

Therefore, the packet voice protocols like ITU-T G.764 or the IETF RTP/RTCP, which were designed based on the conventional wire network, are difficult to use and inefficient in a radio channel environment using CDMA technology.

SUMMARY OF THE INVENTION

It is, therefore, an object of the present invention to provide a radio packet protocol device and method in a mobile communication system, which can support a voice service in packets by use of a MAC (Medium Access Control) protocol supporting a high-speed packet data service in a radio environment.

To achieve this and other objects, there is provided a packet voice communication method in a mobile communication system. Upon generation of voice data, a packet voice channel is assigned, and an active state is entered where packetized voice data is transmitted on the voice channel. If there is no voice data for a predetermined time period in the voice channel active state, the assigned voice channel is released, and an inactive state is entered where no voice data is transmitted. If the next voice data is generated in the inactive state, the voice channel active state is entered and a voice channel is assigned to transmit the next voice data.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described hereinbelow with reference to the accompanying drawings. In the following description, well-known functions or constructions are not described in detail since they would obscure the invention in unnecessary detail.

It is to be appreciated that the following description of the present invention is based on TIA CDMA 2000. Yet, the present invention is also applicable to all systems supporting high-speed packet data.

A logical dsch (dedicated signaling channel) is assigned only in an control-hold state and dedicated to a mobile station. The dsch is used to transmit/receive a control message and operates based on a 20 ms-message. A logical dmch (dedicated MAC channel) is a dedicated channel, assigned to a mobile station only in the control-hold state. The dmch is used to transmit/receive a control message of a MAC layer and control a dtch (dedicated traffic channel), and operates based on a 5 ms-message. A cmch (common MAC channel) is shared by a plurality of mobile stations and assigned only in a suspended/dormant state. The cmch is used to transmit/receive a control message of a MAC layer and operates based on a 20 ms-message. A dtch is a dedicated channel assigned to a mobile station only in an active state and used to transmit/receive traffic. A ctch (common traffic channel) is assigned as common to a mobile station only in a dormant state and used for traffic transmission/reception. A physical channel DCCH (dedicated control channel) is mapped with the logical channels dsch and dmch and the DCCH operates as 20 ms-message and 5 ms message transmission.

Before presenting a description of significant logical channels used in a MAC layer of the CDMA 2000, it is to be noted that 'r' and 'f' are attached to a reverse channel and a forward channel to distinguish them.

A DCCH (Dedicated Control Channel) is assigned as dedicated to each mobile station. The DCCH results from using a channel bandwidth only when there is traffic in a DTX (Discontinuous Transmission) mode. A DCCH is mapped with the dsch/dmch. A CCCH (Common Control Channel) is a channel which each mobile station acquires on the basis of a contention and mapped with the cmch. A FCH (Fundamental Channel) is a channel with which reverse compatibility with IS-95 is obtained and transmits/receives traffic and control information. An SCH (Supplemental Channel) corresponds to a supplemental channel of IS-95B, is based on an outband scheme in which traffic is mainly transmitted, and is dynamically assigned and released by the dmch.

Figure 1:
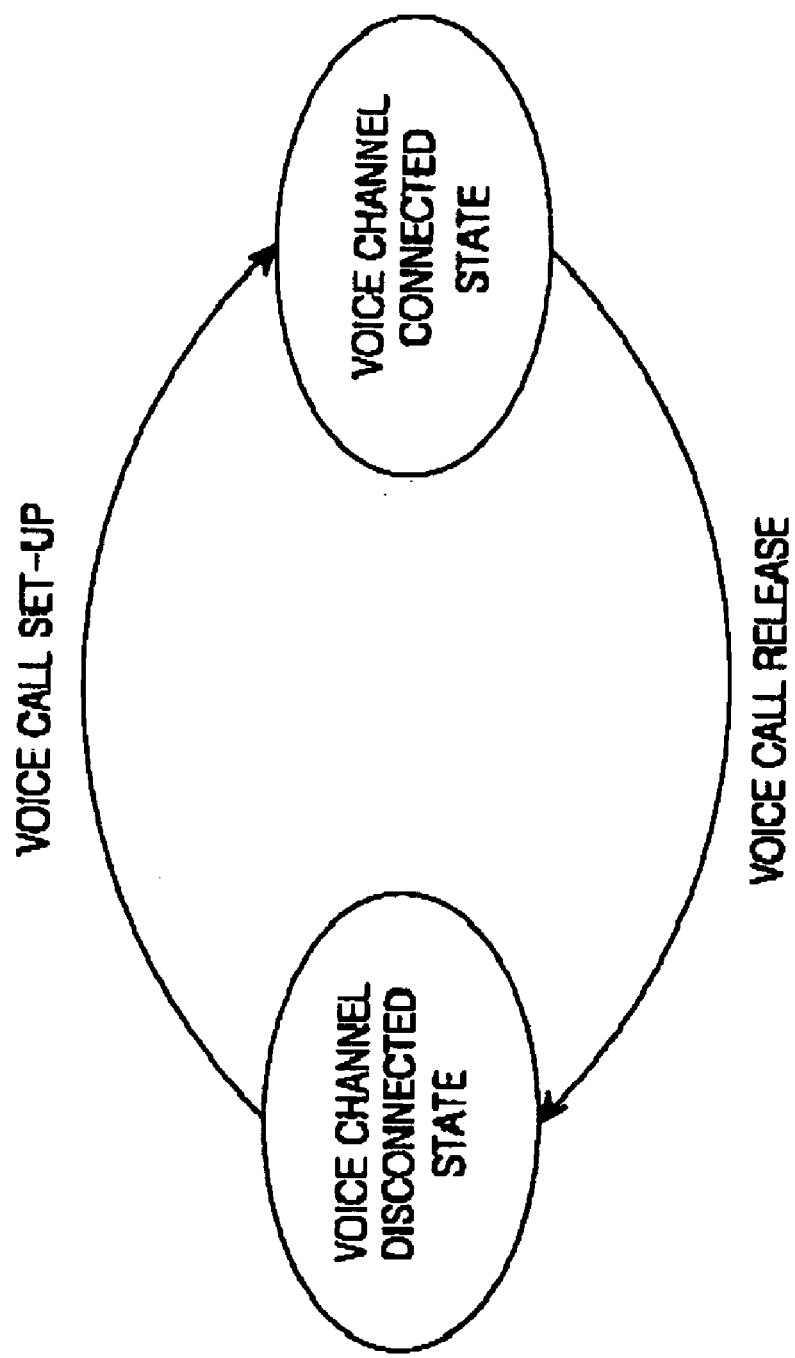
FIG. 1 is a state transition diagram of a voice service supporting structure in a conventional mobile communication system.
Figure 2:
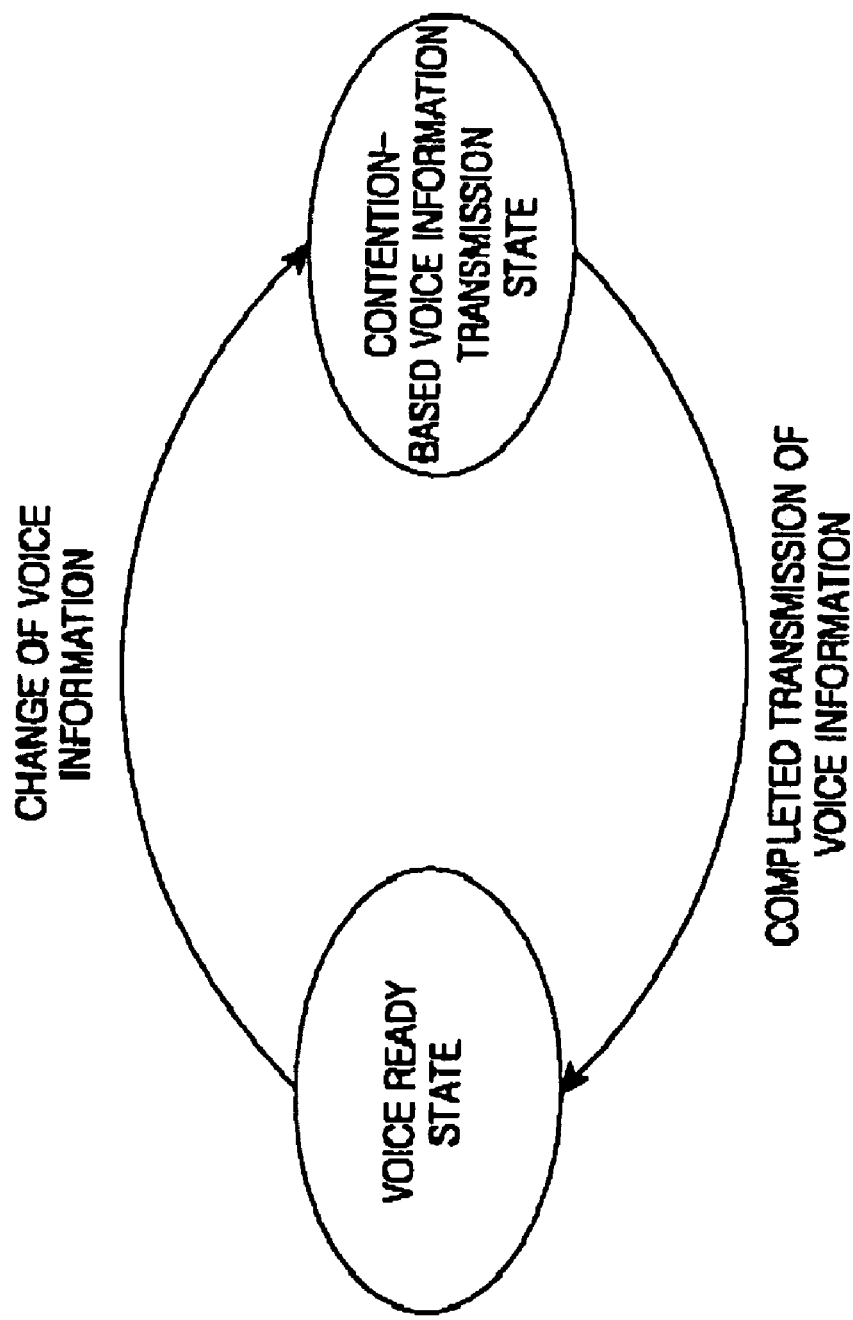
FIG. 2 is a state transition diagram of a packet voice service supporting structure in a conventional wire communication network.
Figure 3:
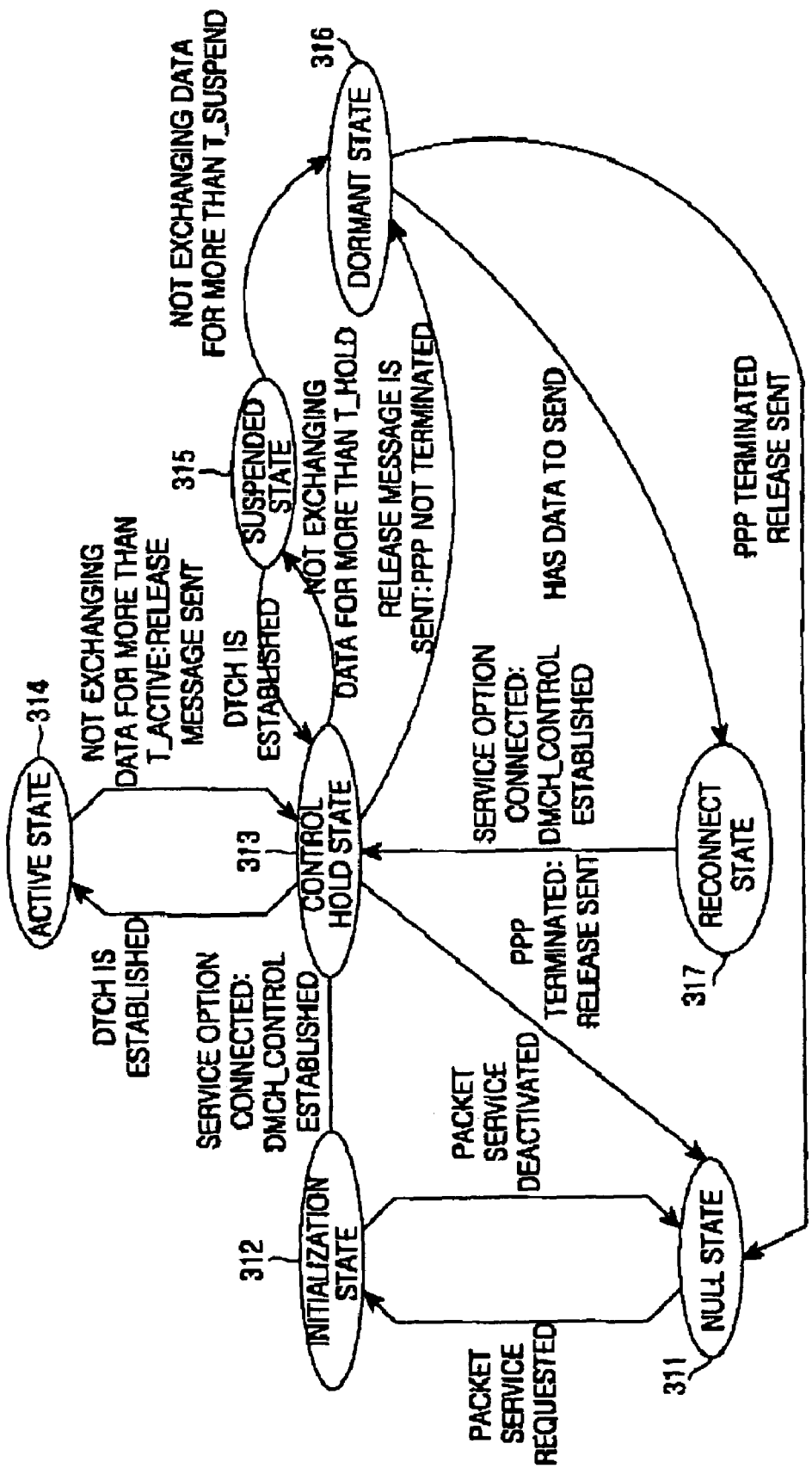
FIG. 3 is a state transition diagram of a MAC protocol supporting a high-speed packet data service.

FIG. 3 is a state transition diagram of a CDMA 2000 MAC protocol. As shown in FIG. 3, the state transition is determined by whether a channel is reserved or not. Each transition is performed with a timer or an artificial primitive.

Referring to FIG. 3, a null state 311 is the state before a call set-up where there is no connection and information. In an initialization state 312, a negotiation for call processing and other actions is carried out upon request for initialization of a packet service on common channels. Shortly after the channel negotiation is completed, a dsch/dmch is connected and a traffic channel is assigned directly via the dmch in a control hold state 313. In an active state 314, a dtch is assigned via the dmch through activation of traffic and traffic data is transmitted/received on the dtch. A DCCH such as the dsch/dmch is released and control information is transmitted/received on a common channel in a suspended state 315. If there is no traffic transmission/reception for a period of time, all channels at or below layer-2 are released and related information is removed in a dormant state 316. Only PPP (Point-to-Point Protocol) information is managed in the dormant state 316. When traffic to be transmitted is generated in the dormant state 316, a reconnect state 317 is entered where the PPP information is maintained and an initial call set-up procedure is performed.

The state transition is based on a timer. For example, after the control hold state 313 transitions to the active state 314 by acquiring a dtch, the suspended state 315 is entered if there is no traffic transmission/reception within T_active (the waiting threshold time period for the active stage). If traffic is not transmitted/received within T_hold (the waiting threshold time period control for the hold state) in the control hold state 313, the suspended state 315 is entered. If there is no data transmission/reception within T_suspended (the waiting threshold time period for the suspended state) in the suspended state 315, the dormant state 316 is entered.

Figure 4:
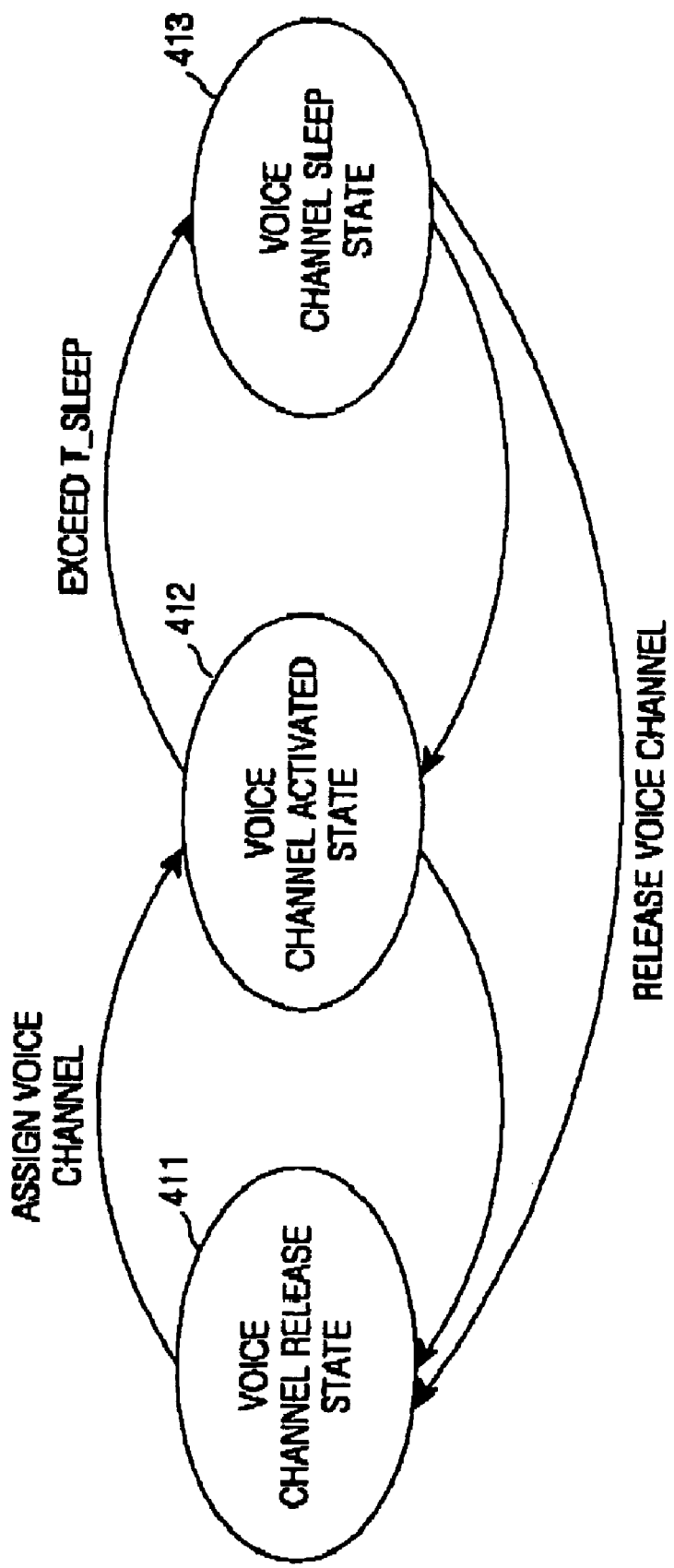
FIG. 4 is a state transition diagram of a physical layer supporting a high-speed packet data service.

A physical channel in CDMA 2000 is placed in a normal state and a sleep state for power control and MAC channel control. FIG. 4 illustrates the state transitions of a physical layer supporting high-speed packet data service in conventional technology.

Referring to FIG. 4, when a voice traffic channel is assigned on a DCCH upon a call request in a voice channel release state 411, a voice channel active state 412 is entered. If there is no traffic transmission/reception within T_sleep (the waiting threshold time period before entering sleep state) in the voice channel active state 412, the voice channel active state 412 transitions to a voice channel sleep state 413. Here, the gain of the traffic channel assigned on the DCCH can be obtained through power control. If traffic to be transmitted/received is generated in the voice channel sleep state 413, the voice channel active state 412 is re-entered through a wakeup procedure. When the voice traffic channel is released in the voice channel active state 412, the voice channel active state 412 transitions to the voice channel release state 411. If the voice traffic channel is released in the voice channel sleep state 413, the voice channel sleep state 413 transitions to the voice channel release state 411. That is, in the absence of traffic transmission/reception within T_sleep, the gain of the traffic channel assigned in the voice channel active state 412 is obtained through power control in the sleep state 413.

The present invention is independent of direct voice coding, like ITU-T G.764. In addition, call set-up and release is performed in a CDMA 2000 call process. Therefore, the present invention uses voice coding for conventional wire/wireless voice communication. However, an overhead including coding information is removed in each packet like the ITU-T G.764 by a negotiating codec or vocoder used for call set-up. Similarly to a packet voice protocol based on a wire network, the present invention includes various error compensation functions and facilitates interconnection with existing wire network-based packet voice protocols.

Figure 5:
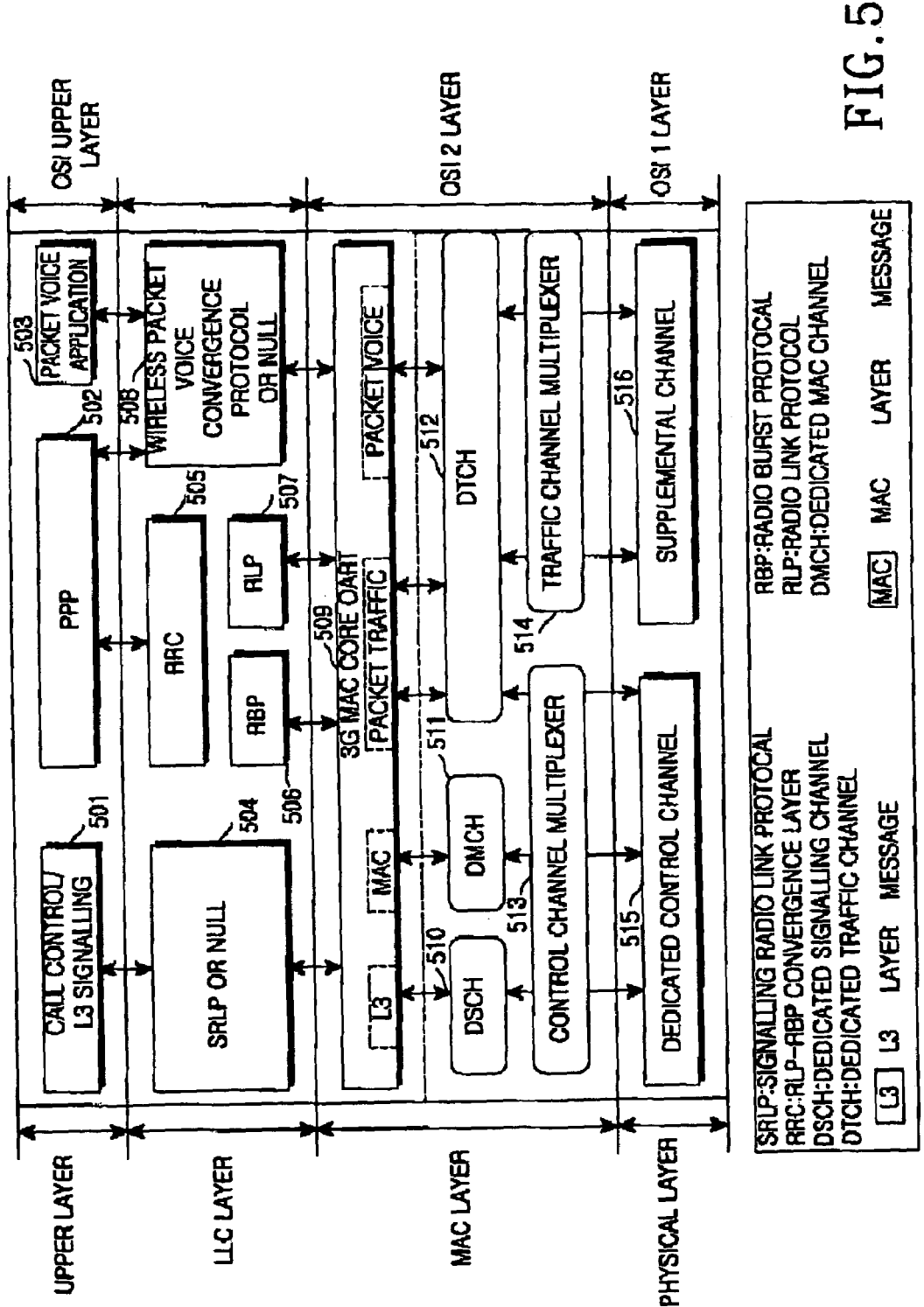
FIG. 5 illustrates the structure of a communication protocol supporting a high-speed packet data service according to an embodiment of the present invention.

FIG. 5 illustrates a main protocol layer structure in a CDMA 2000 communication network according to an embodiment of the present invention.

Referring to FIG. 5, the upper layer is at or above layer-3 in the OSI (Open Systems Interconnection) 7 layer model and the LCC (Logical Link Layer) layer and MAC layer correspond to layer-2. Here, the MAC layer corresponds to a MAC sublayer. The physical layer corresponds to layer-1.

In the upper layer, a Call Control/L3 Signaling Protocol 501 generates signaling messages for initiating and releasing a service. The signaling messages are mapped on a logical channel dsch 510 in the MAC layer through or not through an SRLP (Signaling Radio Link Protocol) and transmitted on a DCCH, which is the physical layer. A PPP (Point-to-Point Protocol) 502 is a layer-3 protocol for use in transmitting/receiving data over the Internet. A data unit generated by the PPP 502 is mapped in an RBP (Radio Burst Protocol) 506 or an RLP (Radio Link Protocol) 507 through a PRC (PLP-RBP Conversation Layer) 505 and transmitted to a supplemental channel, 516 which is a physical layer channel, via a dtch 512, which is a logical channel. Here, the PPP 502 transmits voice data to a W-PVCP (Wireless Packet Voice Convergence Protocol) 508. A packet voice application 503 converts voice data to packet data of a predetermined length and transmits the packet data to a lower layer. Here, the packet data is called a W-PVCP frame and the W-PVCP frame is divided into a header area and voice information area of a variable length.

In the LCC layer, the SRLP 504 is a protocol processor for processing an L3 signaling message. A PRC 505 is an entity which determines whether to provide a service through the RBP 506 or the RLP 507 according to the features of data received from the upper layer. The RBP 506 transmits data without establishing a link between nodes if the amount of data is small. The RLP 507 transmits a large amount of data by establishing a link between nodes for data transmission/reception. The W-PVCP 508 provides synchronization with respect to transmission delay and loss compensation in transmitting voice packets. If a voice packet received from the upper layer is larger than a frame size in the lower MAC layer, the voice packet is divided into MAC layer frames of a predetermined length, and frames received from the lower MAC layer are assembled in sequence and transmitted to the upper application layer.

In the MAC layer, a MAC layer 509 maps frames received from the upper layer on corresponding logical channel For example, an L3 signaling message is mapped on a dsch 510, a signaling message of the MAC sublayer is mapped on a dmch, and a voice packet is mapped on the dtch. The dsch 510 is a logical channel set for transmitting/receiving the L3 signaling message between a mobile station and a base station. A dmch 511 is a logical channel set for transmitting/receiving a MAC sublayer signaling message between a base station and a mobile station. The dtch 512 is a logical channel set for transmitting/receiving user data between a base station and a mobile station. A control channel multiplexer 513 multiplexes the dsch and the dmch into a physical channel DCCH 515. A traffic channel multiplexer 514 multiplexes the dtch into a physical channel SCH 516.

In the physical layer, the DCCH 515 is the channel set for transmitting a control message between a mobile station and a base station. The SCH 516 is the physical-layer channel set for transmitting/receiving user traffic between a mobile station and a base station.

As shown in FIG. 5, since the W-PVCP 508 belongs to the LCC layer, it performs the same function as that of a DLC (Data Link Control) layer in terms of protocol layer structures. A packet voice application dedicated to the W-PVCP 508 is configured above the W-PVCP 508. Therefore, a terminal dedicated to packet voice can be achieved. An IP-based packet voice protocol like an Internet phone can be interconnected to the W-PVCP through the PPP 502. That is, an Internet phone service designed without consideration of a radio environment can be provided on a radio channel. The following description is conducted mainly on a packet voice service provided through the W-PVCP 508.

In an embodiment of the present invention, the W-PVCP 508 performs the following functions.

Regarding call set-up and release for a packet voice service, it is assumed that the W-PVCP 508 defines items related with transmission/reception of packet voice traffic and thus follows a call set-up and release procedure based on the CDMA 2000 radio connection standard. Service options and codec/vocoder parameters for supporting the packet voice service are negotiated by control messages in a call set-up.

Figure 6:
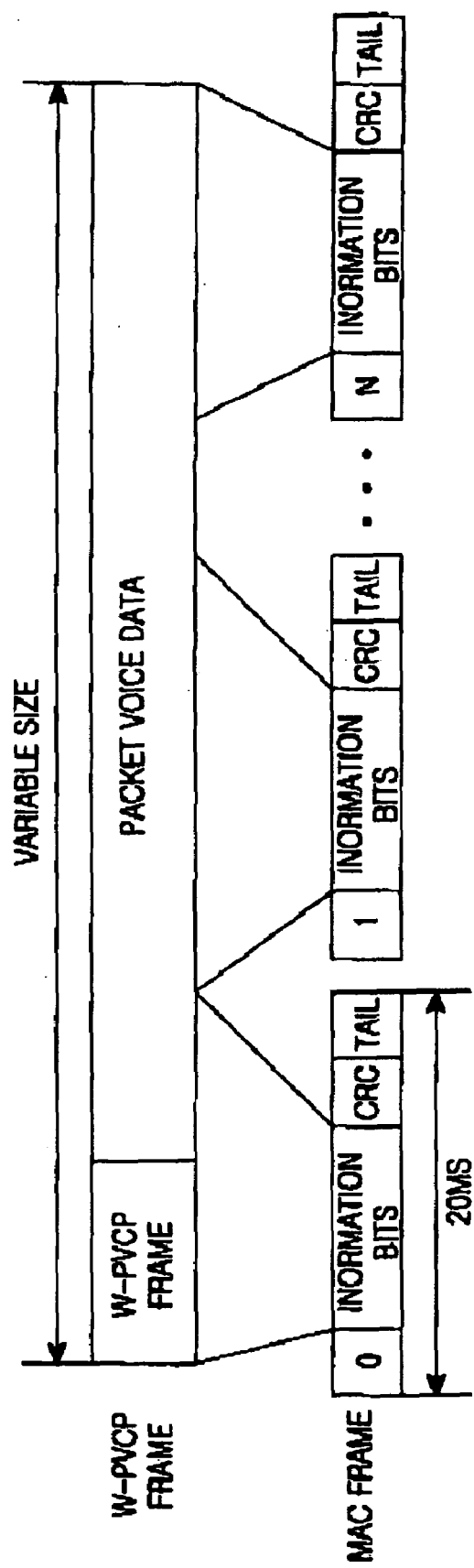
FIG. 6 illustrates assembly and disassembly of a voice frame of a variable length according to an embodiment of the present invention.

Regarding assembly/disassembly of a voice packet of a variable length, the W-PVCP 508 assembles and disassembles frames to map a W-PVCP frame of a variable length or longer than a MAC layer frame to a MAC layer frame of a fixed length. Referring to FIG. 6, a W-PVCP frame is comprised of a header area and a packet voice data area and has a variable length. The W-PVCP frame is divided into a plurality of MAC layer frames. A MAC layer frame includes a subframe number recording area, an information bit area where a packet voice segment is stored, a CRC (Cyclic Redundancy Code) area, and a tail area. The CRC area and the tail area are used by the physical layer. They are virtually generated and processed by the physical area. While a voice frame periodically sampled has a variable length, any W-PVCP frame longer than 20 ms is divided and a sequence number is assigned to each divided subframe since the CDMA 2000 uses a 20 ms MAC layer frame. In IS-95, error detection and recovery are performed without support of a subframe sequence after assembly of frames, but a partially damaged variable voice frame is recovered in a subframe-unit recovery procedure.

Regarding assignment and release of a packet voice traffic channel, the W-PVCP 508 assigns a voice channel by a 5 ms control message of the CDMA 2000 MAC layer. Therefore, a control scheme related with the CDMA 2000 MAC layer is performed with parameters adjusted for voice service. That is, a channel control scheme based on a MAC layer T_active/T_hold timer is executed with careful consideration of the utterance and mute periods of voice. If parameters are set without consideration of voice, the delay in MAC layer state transitions will increase. Since a traffic channel is very rapidly assigned and released to support the packet voice service, the W-PVCP according to an embodiment of the present invention operates with the sleep mode of the CDMA 2000 physical layer as a fundamental structure.

Regarding mute sound removal, the W-PVCP 508 generates traffic only in a voice active period since it supports the packet voice service. Therefore, it does not generate traffic in a mute period. To do so, the W-PVCP 508 removes the mute period from information received in a CODEC (Coder and Decoder) on a predetermined basis, or the CODEC itself removes it. Noise generation in the mute period should be supported at the CODEC level. For this purpose, a noise parameter is involved in a W-PVCP frame and a receiving end generates noise with the noise parameter.

Finally regarding a frame structure, the frame structure in each layer should be defined to support packet voice service using the CDMA 2000 MAC layer. That is, a variable-length frame in the W-PVCP layer and a 20 ms packet frame in the CDMA 2000 MAC layer are modified suitably for voice service.

Figures 7, 8:
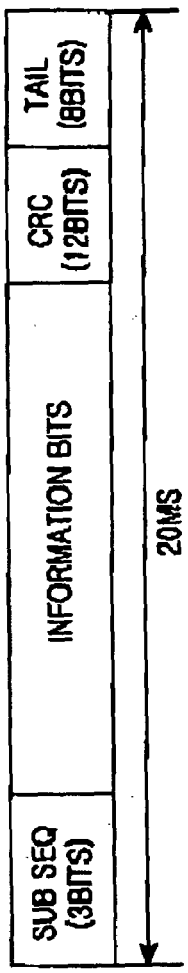
FIG. 7 illustrates the structure of a voice packet in which voice information is transmitted to a radio terminal according to an embodiment of the present invention.
FIG. 8 illustrates the structure of a MAC frame for transmitting a packet voice frame according to an embodiment of the present invention.

FIG. 7 illustrates the structure of a W-PVCP frame according to an embodiment of the present invention. The W-PVCP frame is of variable length and provides compatibility with the ITU-T G.764. Referring to FIG. 7, the W-PVCP frame includes a 3-byte fixed header area, an area indicating the variable length of voice information, FEC (Forward Error Correction) or CRC area for enabling the header area to be reliably transmitted in a radio error environment, a voice information area (optionally droppable blocks) for selective blocking of voice information in a congestion period or when errors are generated, and a voice information area (non-droppable blocks) which should be transmitted without fail.

A session ID field represents the number of a logical channel used to distinguish a plurality of channels together with a subsequence field of a MAC layer. An M (More bits) field is set to 1 for a first message in W-PVCP voice activation and to 0 for other messages. A sequence number field occupies 4 bits and a larger sequence number (e.g., 7 or 8 bits) can be used in an environment of serious errors. A time stamp field represents a voice packet generation time (or an accumulated packet queueing delay from the ITU-T perspective) for use in voice recovery. A noise field represents the noise level in generating the voice packet and is used to generate noise in a mute period at a receiving end. A block dropping indicator field indicates a droppable block of a lower priority in the current voice packet. Dropping a block with a lower priority is performed during voice recovery in a congestion period or at an error generation. The length of the compressed voice information in the voice packet is included in the length field. A CRC/FEC field for a header is used to correct errors in the header. An optional CRC/FEC field for a data area supports only CRC or is not used. This is a structure in which no error control field is supported, since retransmission of packet voice data is meaningless.

FIG. 8 illustrates the structure of the MAC layer frame supporting a packet voice service according to the present invention. The MAC layer frame is basically a CDMA 2000 MAC layer traffic frame and has a fixed length of 20 ms. In particular, to support the packet voice service, a subframe sequence field is added to the MAC layer frame. Referring to FIG. 8, the subframe number, an information bit area, a CRC area, and a tail bit area are arranged in this order in the MAC layer frame. The CRC and tail bits are shared between the physical layer and the MAC layer, and are virtually generated and processed by the physical layer.

The state of packet voice service according to an embodiment of the present invention can vary depending on the states of the W-PVCP and the MAC layer. This is because the MAC layer releases a channel in the absence of voice traffic to be transmitted and thus the service transitions among the control-hold state, the active state, the suspended state, and the dormant state. Further, since the physical layer transitions between the normal state and the sleep state in order to save power, various situations can be considered according to the states of the W-PVCP, the MAC layer, and the physical layer. The reason for contemplating various situations is to consider an environment where an end-to-end delay can be accommodated.

The most significant consideration in achieving a packet voice protocol according to an embodiment of the present invention is that a traffic channel is assigned when necessary and released between voice traffic transmissions so that the traffic channel does not remain assigned until the call is released. Therefore, the delay involved in assigning a traffic channel according to the MAC layer and the normal/sleep/disconnect state of the DCCH physical layer should be considered when achieving a packet voice protocol using the CDMA 2000 MAC layer.

In view of the fact that a maximum end-to-end time delay of a packet voice protocol in a typical wire network is 200 ms, a packet voice service can be supported when using a high-speed packet data MAC layer, only if the MAC layer is placed in an active state/control hold state and the DCCH physical layer is in a normal state/sleep state.

Particularly, since the dtch is connected in the active state, there is no time delay in voice service if the packet voice protocol favors the active state. However, if the voice service is in the active state longer, the dtch is maintained longer. This results in the channel reuse rate being too low to accommodate multiple subscribers.

The dtch is absent and only a DCCH is assigned in the control hold state. This results in the reuse rate of a traffic channel being high enough to accommodate multiple subscribers. Since the DCCH operates in a discontinuous transmission (DTX) mode and is identified by a long code, there is little bandwidth loss caused by maintenance of the DCCH. In the case where the MAC layer is in the control hold state and the physical layer of the DCCH is in sleep mode, power is saved in the base station and the mobile station, resulting in efficient bandwidth use. However, if the DCCH is in normal/sleep mode, a delay of 20–30 ms occurs in assigning a traffic channel. Thus, an end-to-end delay in voice service must be accommodated.

Figure 9:
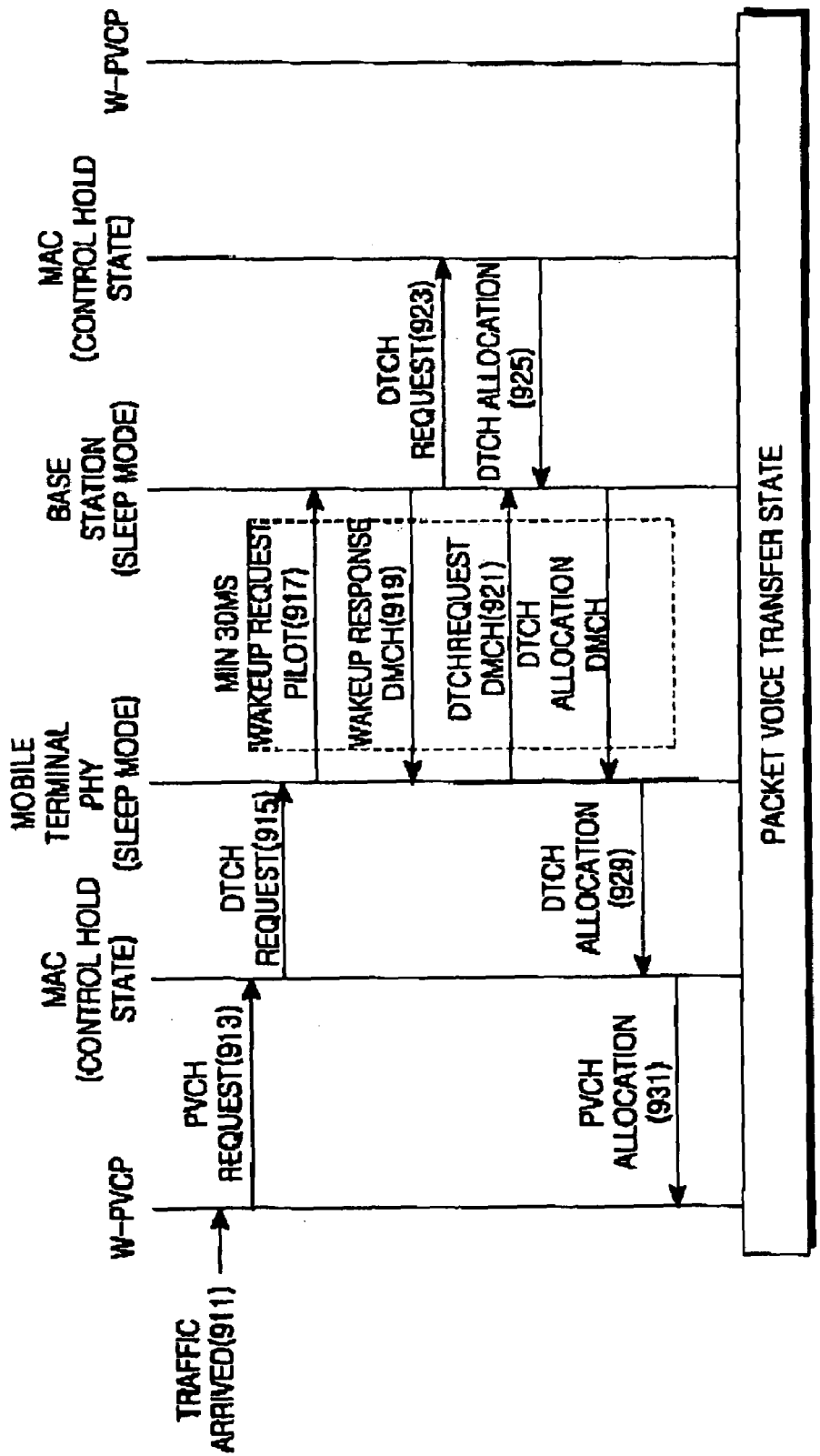
FIG. 9 illustrates the procedure of assigning a packet voice channel according to a MAC protocol and the state of a physical channel according to an embodiment of the present invention.

FIG. 9 illustrates a procedure of assigning a dtch for transmitting voice traffic according to the present invention when the MAC layer is in control hold state and the physical layer of a DCCH is in sleep mode. In FIG. 9, a mobile station requests a traffic channel, which is similar to the situation where a base station requests a traffic channel. Referring to FIG. 9, upon reception of packetized voice traffic in step 911, the W-PVCP 508 requests assignment of a dtch (PVCH: packet voice channel) for transmitting the packetized voice traffic to the MAC layer in step 913. Then, the MAC layer passes the request for assigning the dtch to the physical layer in step 915. Here, if a sleep mode (or gating mode) is set and the DCCH is in a sleep state, a wakeup procedure is required and thus channels whose power was reduced are increased to normal levels. Then the physical layer of the mobile station requests a wakeup from the base station in step 917. The physical layer of the base station transmits a response to the wakeup request on an f-dmch to the base station in step 919. In step 921, the physical layer of the mobile station requests assignment of an r-dtch from the base station on an r-dmch. The physical layer of the base station passes the request for a dtch to the MAC layer in step 923 and the MAC layer notifies the physical layer of assignment of a dedicated channel in step 925. In step 927, the base station physical layer informs the mobile station of the traffic channel assignment on the f-dmch. The physical layer of the mobile station informs the MAC layer of assignment of a dtch in step 929 and the MAC layer informs the W-PVCP of assignment of a PVCH in step 931.

Through the above procedure, the mobile station acquires a dtch for transmitting activated packet voice traffic and transmits the packet voice traffic on the dtch. In this case, a 5 ms control message is used in transmitting/receiving a message on the dmch. This causes a small delay in the channel assignment. Since each dmch is identified by a long code in the case of the DCCH, use of the DCCH result in little bandwidth reduction. In addition, since the physical channel uses a sleep mode, the base station and the mobile station save power.

Figure 10:
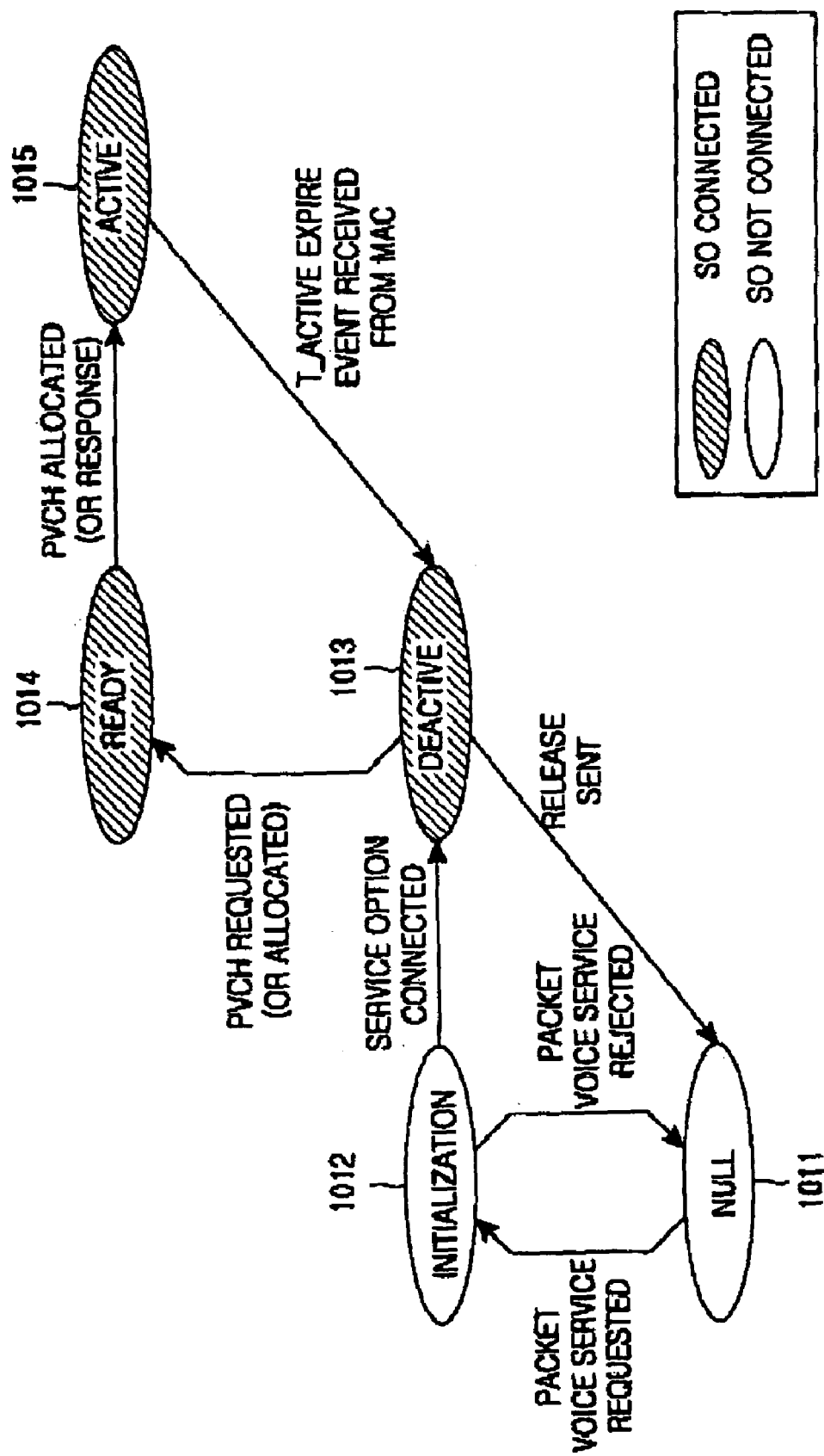
FIG. 10 is a state transition diagram of W-PVCP (Wireless Packet Voice Convergence Protocol) according to an embodiment of the present invention.

FIG. 10 illustrates the state transitions of the W-PVCP according to an embodiment the present invention. Referring to FIG. 10, nothing occurs in null state 1011. If a radio packet voice service is initiated in a base station or a mobile station, the null state 1011 transitions to an initialization state 1012. A call procedure for supporting the corresponding service is performed in the initialization state 1012 and if a service negotiation is made through the call process, the initialization state 1012 transitions to an inactive state 1013. In the inactive state 1013, the packet voice service is connected but voice is not activated. Thus, no traffic is generated. If voice traffic is activated in the mobile station or the base station, the ready state 1014 is entered where the packet voice service is activated and a traffic channel is assigned upon request for a PVCH. When the traffic channel is assigned and traffic is transmitted, the active state 1015 is entered. The activated voice traffic is transmitted in the active state 1015. If no traffic is transmitted/received within a predetermined time period in the active state 1015, the inactive state 1013 is entered, waiting for the next traffic activation.

FIGS. 11 to 13C illustrate operations of the W-PVCP with respect to voice packet delay and errors according to an embodiment of the present invention.

Figure 11:
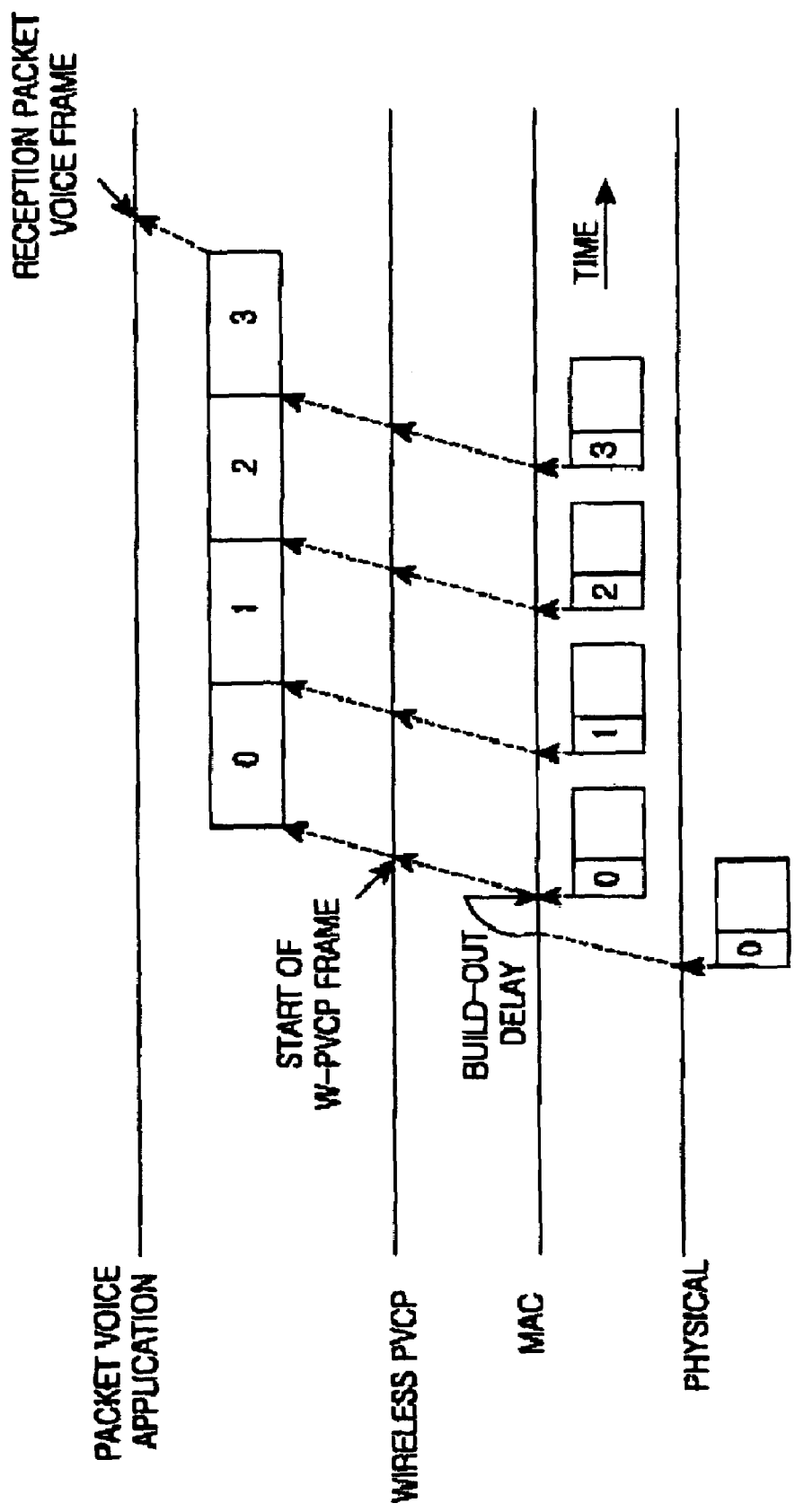
FIG. 11 illustrates synchronization for delay compensation at a radio terminal according to an embodiment of the present invention.

FIG. 11 illustrates the operation of processing a voice packet received in a normal environment. Referring to FIG. 11, to keep synchronization by compensating for the round trip time (RTT) delay of a radio transmission in a normal case, the W-PVCP stores voice packets received from the lower MAC layer for a predetermined time period, assembles successively received voice packets, and transmits the assembled voice packets to an upper packet voice application. That is, in order to compensate for RTT delay, the W-PVCP supports a build-out delay based on the delay of a first received voice packet, and the build-out delay is calculated in 10 ms order. In the build-out scheme, an RTT is calculated based on time-stamp information in the first voice packet and then the subsequent voice packets are transmitted with a build-out delay after they arrive at the receiver. By using this built-out scheme, the time-interval between voice packets at the voice reconstruction module can be made uniform.

Figure 12:
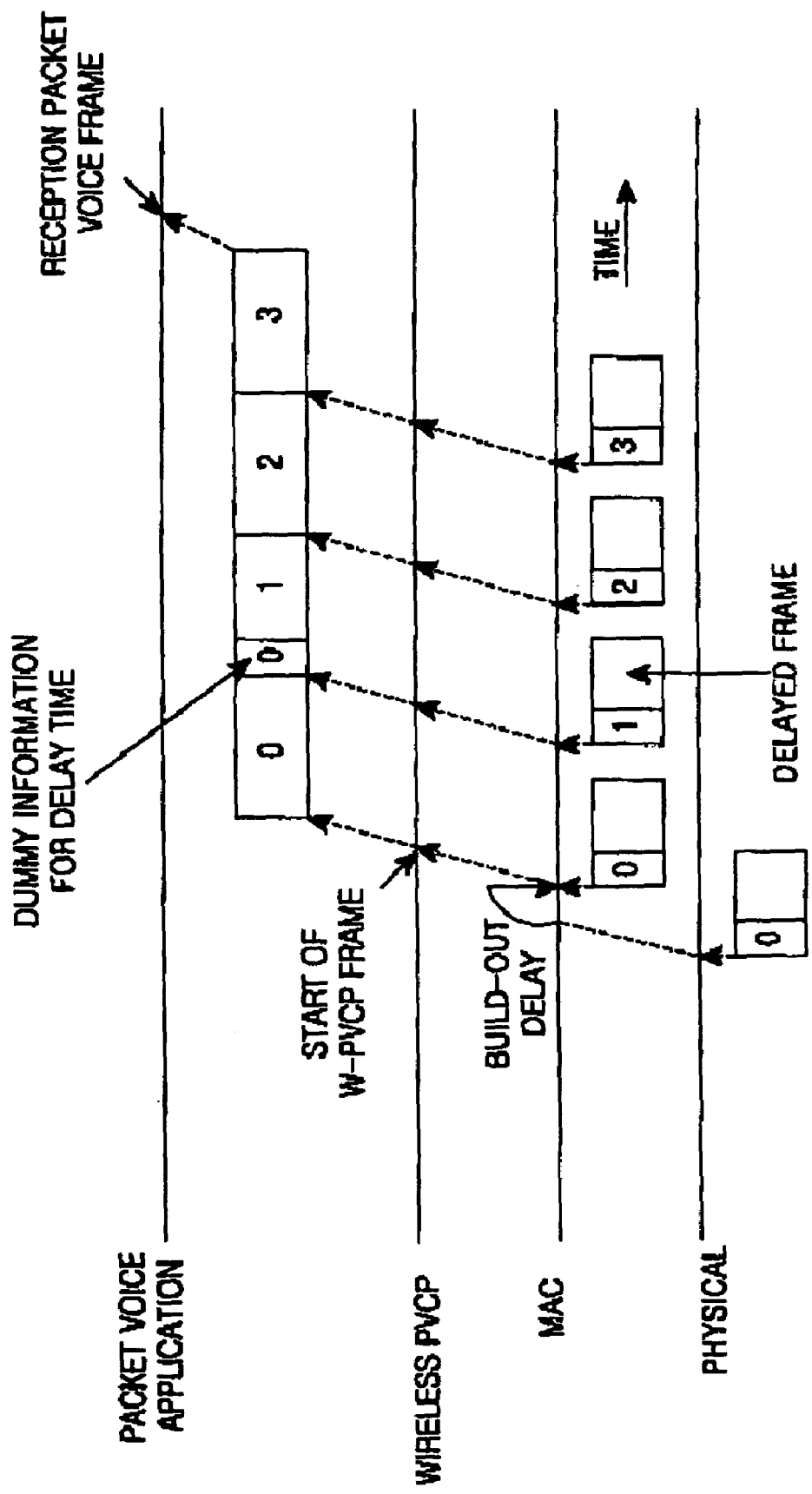
FIG. 12 illustrates delay processing when a delayed voice frame is received according to an embodiment of the present invention.

FIG. 12 illustrates an operation of processing a voice packet when successive frames are delayed. The delay can occur due to a delay at the radio terminal or a processing delay in the physical layer or the MAC layer. Dummy information is inserted for the delay time without discarding the entire frame and the frame having dummy information is transmitted to the packet voice application.

Figure 13A:
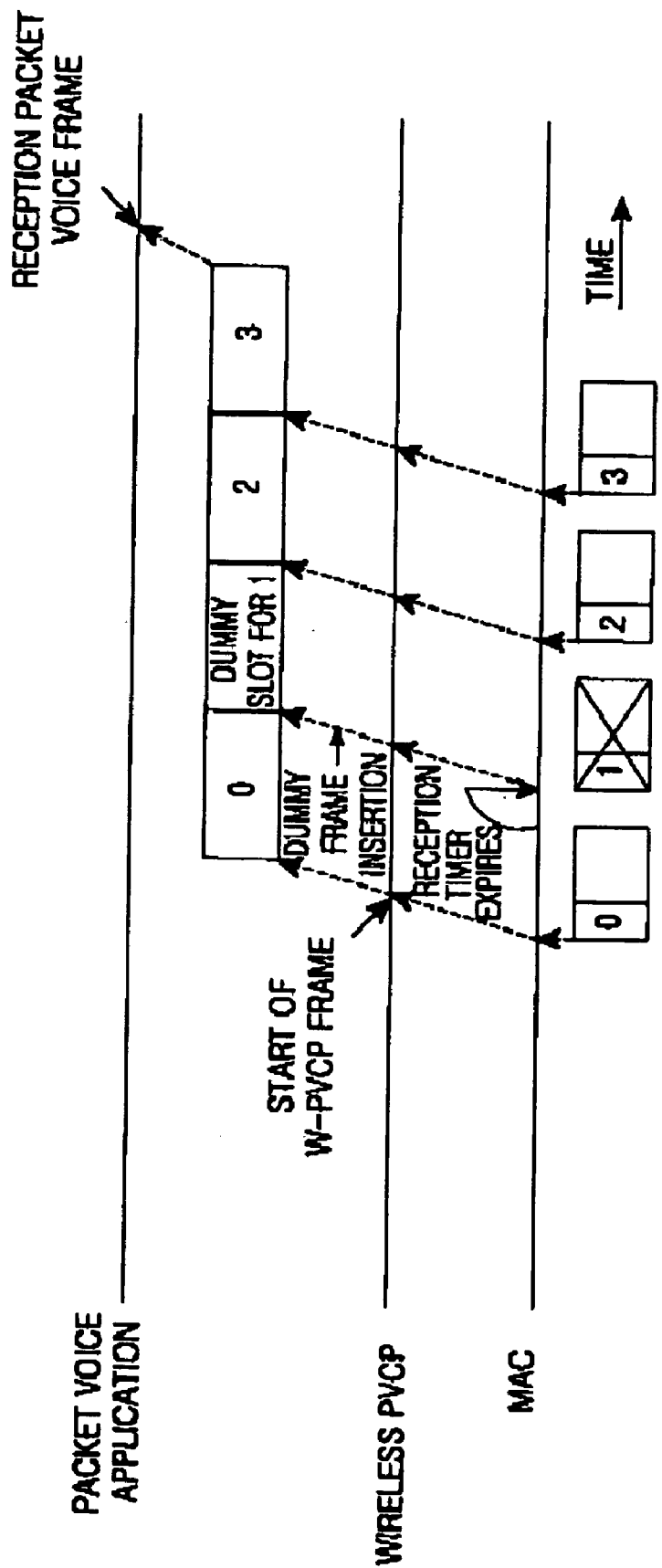
FIGS. 13A, 13B, and 13C illustrate procedures of processing voice frames having errors according to an embodiment of the present invention.
Figure 13B:
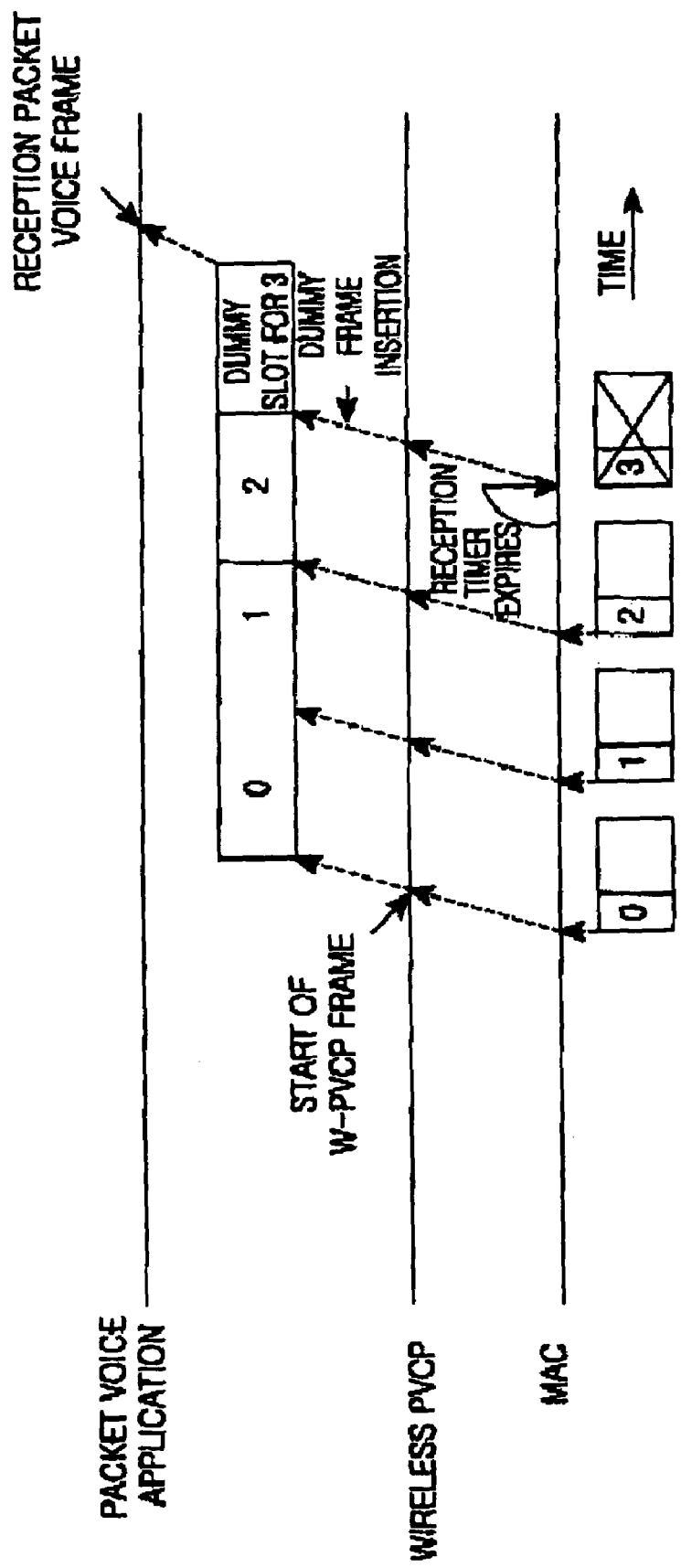
Figure 13C:
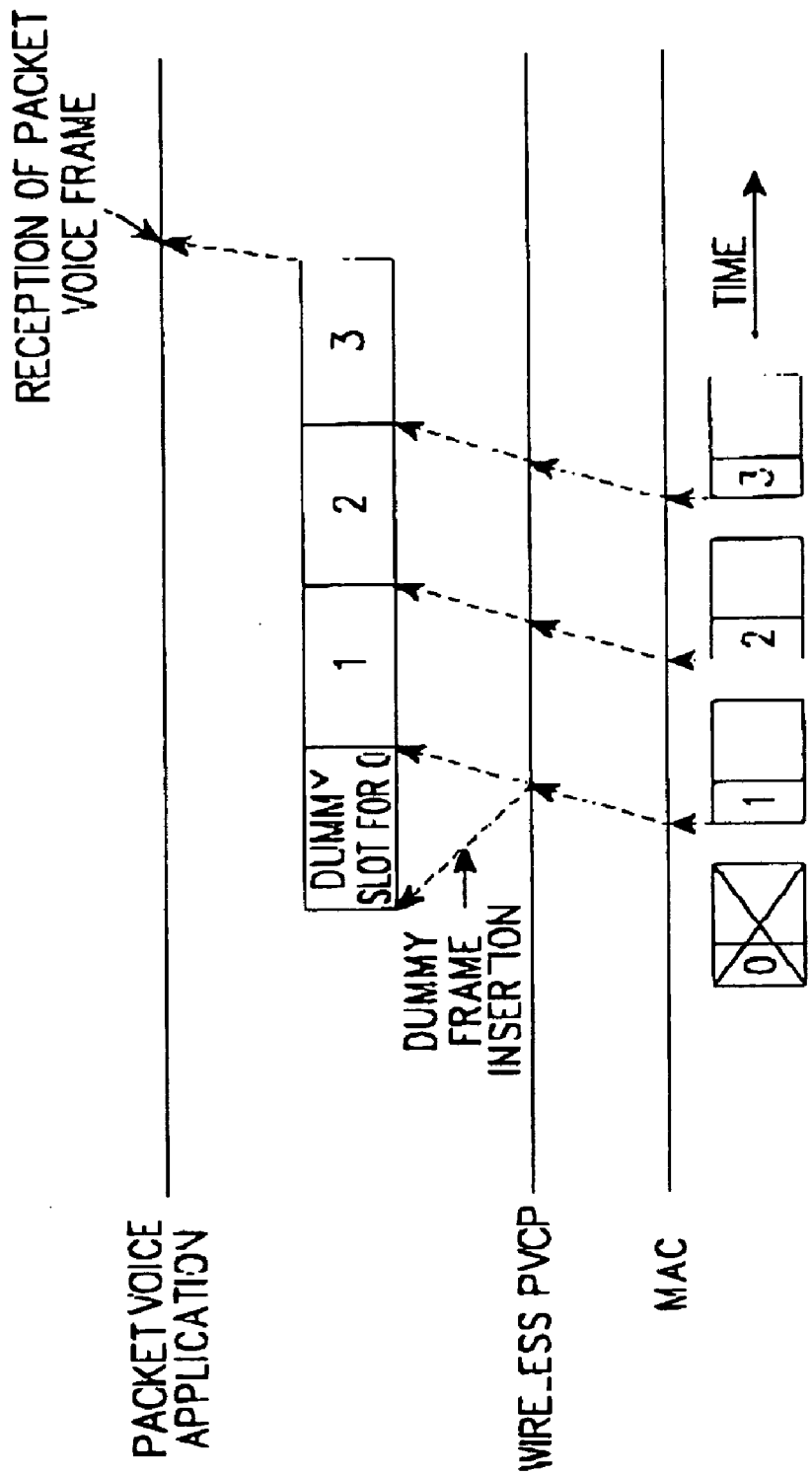

FIGS. 13A, 13B, and 13C illustrate the process when errors occur. The W-PVCP detects errors based on the subframe sequence number recorded in the MAC layer frame. When a variable-length frame is partially damaged, the W-PVCP performs compensation for the frame, recovers the voice traffic, and transmits the recovered voice traffic to the packet voice application. That is, a dummy slot is inserted into the damaged portion of the frame and the recovered frame is transmitted to the packet voice application. Here, FIG. 13A illustrates a frame whose center is partially is lost, FIG. 13B illustrates a frame whose end is lost, and FIG. 13C illustrates a frame whose sequence number portion is lost.

The W-PVCP does no retransmission of voice traffic in relation to error detection and correction. Error control is basically not performed on voice data. Therefore, only CRC is used in the W-PVCP level and errors are only corrected in the header by supporting FEC. This method allows the use of partially correct information in an error-containing packet by performing error compensation without retransmission of the packet. The errors of the header are compensated by FEC since it transmits W-PVCP-related control information. Consequently, the W-PVCP supports error detection based on the subframe sequence number. It appropriately compensates for a partially damaged variable-length frame and sends corresponding traffic to the packet voice application. Errors in the voice traffic are not detected.

As described above, the present invention teaches a W-PVCP protocol which can support a radio packet voice service in a high-speed packet data system. The suggested W-PVCP protocol supports a voice service structure in a mobile communication system focusing on a line-type service in the concept of a packet-type service, to thereby make the best use of limited radio resources. That is, bandwidth abuse caused by mute periods in the conventional line type scheme is overcome and more subscribers can be accommodated by application of statistical multiplexing of the bandwidth. Therefore, the number of subscribers which can be accommodated is increased from the conventional mobile phone system by about 250% to 280%.

While the invention has been shown and described with reference to a certain preferred embodiment thereof, it will be understood by those skilled in the art that various changes in form and details may be made therein without departing from the spirit and scope of the invention as defined by the appended claims.

What is claimed:

1. A packet-based voice communication device in a mobile communication system having a layered protocol architecture, comprising:
   a W-PVCP (Wireless Packet Voice Convergence Protocol) layer for requesting to assign a packet voice channel upon generation of voice traffic, entering an active state, and mapping a voice packet of variable length generated only upon activation of voice traffic onto a packet frame of a fixed length; and
   a MAC (Medium Access Control) layer and a physical layer for assigning the packet voice channel and transmitting the mapped packet frame to a station on the packet voice channel.

2. The device of claim 1, wherein said W-PVCP layer is interconnected with a packet voice protocol over a wire network through an upper PPP (Point-to-Point Protocol) layer.

3. The device of claim 1, wherein said MAC layer operates in an active state and a control hold state.

4. The device of claim 1, wherein said physical layer operates in a normal state and a sleep state.

5. The device of claim 1, wherein said voice packet of a variable length includes:
   a header area which has a section ID field indicating a logical channel number, a field indicating a first message, a frame sequence number field, a time stamp field indicating a voice packet generating time, a field indicating low priority blocks, and a noise field for generating noise in a mute period at a receiving side;
   a length area representing the length of voice information;
   a CRC (Cyclic Redundancy Code)/FEC (Forward Error Control) area for error correction of the header area;
   a voice information area for low priority blocks that are dropped when errors occur; and
   a non-droppable voice information area.

6. The device of claim 1, wherein said packet frame includes:
   a subframe sequence area representing the sequence of the packet frame;
   an information area for storing a divided voice packet;
   a CRC area for error correction of the packet frame; and
   a tail area indicating the termination of the packet frame.

7. The device of claim 6, wherein said CRC and tail areas are used by the physical layer.

8. The device of claim 1, further comprising timers in the MAC layer for state transition thresholds, wherein said timers are set according to an utterance period and a mute period of the voice traffic.

9. A packet-based voice communication device in a mobile communication system having protocol architecture comprising:
   a physical layer and a MAC (Medium Access Control) layer for transmitting a voice packet received on a channel to a W-PVCP (Wireless Packet Voice Convergence Protocol) layer;
   wherein said W-PVCP layer calculates a synchronization delay by utilizing a time stamp included in a first voice packet received from said MAC layer, buffers the subsequent voice packets for a predetermined time period based on the synchronization delay, and transmits the buffered voice packets to a packet voice application.

10. The device of claim 9, wherein said W-PVCP layer detects a lost packet from sequence numbers of the voice packets received from the MAC layer and transmits a dummy slot instead of the lost packet to said packet voice application.

11. The device of claim 9, wherein said W-PVCP layer detects an arrival delay of the voice packet caused by a process delay in the physical layer or MAC layer and transmits a dummy slot for the time delay to the packet voice application.

12. A packet-based voice communication method in a mobile communication system, comprising the steps of:
   assigning a packet voice channel upon generation of voice data, entering an active state, and transmitting packetized voice data on said packet voice channel;
   releasing the assigned packet voice channel when there is no voice data to be transmitted for a predetermined time period, and entering an inactive state; and
   re-entering the packet voice channel active state from the inactive state when a packet voice channel is assigned to transmit newly generated voice data;
   wherein said packet voice channel is assigned by a control message of a MAC (Medium Access Control) layer.

13. A packet-based voice communication method in a mobile communication system having a layered protocol architecture, comprising the steps of:
   converting voice data generated by a packet voice application to packet data of a variable length only upon activation of voice traffic;
   requesting to assign a packet voice channel upon generation of voice traffic, entering an active state, and mapping said packet data of a variable length to at least one packet frame of a fixed length by a W-PVCP (Wireless Packet Voice Convergence Protocol) layer;

passing said mapped packet frame to a MAC (Medium Access Control) layer; and assigning the packet voice channel and transmitting the mapped packet frame on the packet voice channel by a physical layer.

14. The method of claim 13, wherein said W-PVCP layer maps the packet voice data received over a wire network to said packet frame of a fixed length through an upper PPP layer.

15. The method of claim 13, wherein said MAC layer operates in an active state and a control hold state.

16. The method of claim 13, wherein said physical layer operates in a normal state and a sleep state.

17. A packet-based voice communication method in a mobile communication system having a layered protocol architecture, comprising the steps of:

passing a voice packet received on a channel to a W-PVCP (Wireless Packet Voice Convergence Protocol) layer by a MAC (Medium Access Control) layer;

calculating a synchronization delay by referring to a time stamp included in a first voice packet received from said MAC layer, buffering the following voice packets for a predetermined time period based on the synchronization delay, and transmitting the buffered voice packets to a packet voice application by the W-PVCP layer.

18. The method of claim 17, wherein said W-PVCP layer detects a lost packet from the sequence numbers of the voice packets received from said MAC layer and transmits a dummy slot in place of the lost packet to the packet voice application.

19. The method of claim 17, wherein said W-PVCP layer detects an arrival delay of the voice packet caused by a process delay in a physical layer or said MAC layer and transmits a dummy slot for the time delay to the packet voice application.

* * * * *